United States Patent [19]

Aikins et al.

[11] Patent Number: 4,920,627
[45] Date of Patent: May 1, 1990

[54] BALANCED CARRIER ROLLS AND METHODS OF FABRICATION

[75] Inventors: Robert D. Aikins, Norristown; Lee R. Bandy, West Chester; William R. Davis, Downingtown; Robert E. Delaney, Devon; Michael E. Guyer, Coatesville; Edward D. Lovera, Aston; Thomas A. Scamuffa, Parkesburg, all of Pa.

[73] Assignee: LG Industries, Inc., Wagontown, Pa.

[21] Appl. No.: 160,620

[22] Filed: Feb. 26, 1988

[51] Int. Cl.$^5$ .............................................. B23P 7/00
[52] U.S. Cl. .................................... 29/402.08; 29/129
[58] Field of Search ...................... 29/402.08, 110, 123, 29/129

[56] References Cited

U.S. PATENT DOCUMENTS

| | | |
|---|---|---|
| 26,387 | 12/1859 | Vandeventer . |
| 933,604 | 9/1909 | Wagg . |
| 973,380 | 10/1910 | Parker . |
| 1,568,334 | 1/1926 | Hubbard . |
| 1,588,796 | 6/1926 | Malkin . |
| 1,759,192 | 5/1930 | Fulk . |
| 1,904,498 | 4/1933 | McGhee . |
| 2,005,885 | 6/1935 | Brindley . |
| 2,257,025 | 9/1941 | Schuster . |
| 2,452,266 | 10/1948 | Scharff . |
| 2,477,856 | 8/1949 | Benoit . |
| 2,501,629 | 3/1950 | Goulding . |
| 2,501,630 | 3/1950 | Goulding . |
| 2,538,499 | 1/1951 | Benoit . |
| 2,563,692 | 8/1951 | Ostertag et al. . |
| 2,578,406 | 12/1951 | Dutro . |
| 2,628,433 | 2/1953 | Ostertag . |
| 2,661,546 | 12/1953 | Petry et al. . |
| 2,699,736 | 1/1955 | Sticelber . |
| 2,715,879 | 8/1955 | Sawyer . |
| 2,723,523 | 11/1955 | Baierlein . |
| 2,752,632 | 7/1956 | Winstead . |
| 2,918,867 | 12/1959 | Killary et al. . |
| 2,926,628 | 3/1960 | Black et al. ................... 29/123 X |
| 2,984,954 | 5/1961 | Burt . |
| 3,042,996 | 7/1962 | Nelson . |
| 3,129,659 | 4/1964 | Lauer . |
| 3,139,375 | 6/1964 | Bryand . |
| 3,234,769 | 2/1966 | Bretschneider . |
| 3,251,199 | 5/1966 | Brady . |
| 3,405,538 | 10/1968 | Graham et al. . |
| 3,453,712 | 7/1969 | MacKendrick . |
| 3,457,618 | 7/1969 | O'Neal et al. . |
| 3,601,048 | 8/1971 | Beisel . |
| 3,775,820 | 12/1973 | Harris . |
| 3,805,550 | 4/1974 | Patton . |
| 3,990,802 | 11/1976 | Corona . |
| 4,034,837 | 7/1977 | Vinarcsik et al. . |
| 4,229,950 | 10/1980 | Fessenden . |

(List continued on next page.)

Primary Examiner—Timothy V. Eley
Attorney, Agent, or Firm—Panitch, Schwarze, Jacobs & Nadel

[57] ABSTRACT

Metal carrier rolls having a mass of at least about 100 pounds for use in paper making, non-woven fabric making and other applications are balanced to within a predetermined first residual unbalance value for rotation of the roll up to a predetermined maximum service speed of at least about 100 RPM, preferably within a Balance Quality Grade G-6.3 residual unbalance value, by fabricating a pair of substantially identical removably mountable metal journals, each being balanced to within a second residual unbalance value less than the first residual unbalance value, preferably to within a Balance Quality Grade G-2.5 residual unbalance value, fabricating a body assembly including a hollow metal body with a pair of metal end heads each being adapted for removably mounting a journal, the body assembly being balanced to within a third residual unbalance value less than the difference between the first and twice the second residual unbalance values, and, preferably, within a Balance Quality Grade G-2.5 residual unbalance value, and removably mounting the pair of journals to the end heads to form the roll balanced to within the first residual unbalance value.

22 Claims, 1 Drawing Sheet

U.S. PATENT DOCUMENTS

| | | |
|---|---|---|
| 4,232,455 | 11/1980 | Burton . |
| 4,235,002 | 11/1980 | Pav et al. . |
| 4,385,453 | 5/1983 | Withers, Jr. et al. . |
| 4,385,454 | 5/1983 | Withers et al. . |
| 4,406,418 | 9/1983 | Raasch . |
| 4,503,626 | 3/1985 | Rothenbacher et al. . |
| 4,506,459 | 3/1985 | Swick . |
| 4,621,400 | 11/1986 | van der Graaf . |
| 4,625,376 | 12/1986 | Schiel et al. . |
| 4,640,190 | 2/1987 | Holzapfel .......................... 29/123 X |
| 4,642,862 | 2/1987 | Muhle et al. . |
| 4,648,355 | 3/1987 | Bekedam . |
| 4,649,631 | 3/1987 | Orth . |
| 4,668,111 | 5/1987 | Kapaan . |
| 4,679,390 | 7/1987 | Stewart . |
| 4,734,966 | 4/1988 | Zapralek .......................... 29/110 X |

BALANCED CARRIER ROLLS AND METHODS OF FABRICATION

FIELD OF THE INVENTION

The invention relates to metal rolls, particularly large metal carrier rolls used to convey and/or drive stock or supporting conveyors in paper making and non-woven fabric making lines.

BACKGROUND OF THE INVENTION

Large, metal carrier rolls are widely used in paper making and non-woven fabric lines to convey and/or drive the paper or fabric stock or conveyor belts supporting the stock. These rolls have a variety of names depending upon their particular operation and location in the lines. These include wire rolls, table rolls, paper rolls, carrying rolls, blow rolls, felt rolls (dry or wet), drive rolls (wire, felt or dryer felt), head rolls, tail rolls, etc.

Common characteristics of these rolls are that they are relatively large, typically having outer diameter; of about six inches to about eighteen or more inches, lengths cf about five feet to about twenty-five or more feet and masses of about 200 to about 12,000 or more pounds. Maximum surface speeds of such rolls might range from about 160 feet per minute for the smallest diameter rolls to about 5,000 feet per minute for the larger diameter rolls.

The carrier rolls in question are further distinguished from press rolls, which are of a much heavier construction. Typically, press rolls are loaded in operation from about 100 to about 3,000 or more pounds per linear inch of axial length of the roll. The carrier rolls to which the present invention is directed are subjected to lesser loads. In paper making, the loading on carrier rolls during operation is less than about 100 pounds per linear inch.

A number of methods have previously been employed to fabricate the large, metal carrier rolls to which the present invention is directed. Such rolls typically comprise a hollow, generally cylindrical metal body having a pair of open axial ends each of which contains a metal end head supporting a journal. One prior method of fabricating such rolls has been to install an axially elongated piece of cylindrical metal stock in each open axial end of the body and machine an end of the stock protruding from the body into a journal. Another method has been to install a machined journal shaft through an annular metal end head, mount the end head with journal shaft in an open axial end of the body and thereafter turn and balance the body.

Regardless of the methods previously employed to fabricate the rolls, it has always been a requirement that the rolls be balanced to within a predetermined residual unbalance value for rotation up to a predetermined maximum service speed for the roll. During balancing, such rolls would be supported on their journals in a dynamic balancing machine and rotated on the journals to determine the state of balance of the roll. Thereafter, conventional steps such as the removal of metal by drilling are performed on the roll to bring it within an allowable residual unbalance value for rotation up to the predetermined maximum service speed.

Major problems arise for the roll users when such rolls must be repaired. Spare rolls are typically not stocked by or the manufacturer and often are not stocked by the user. When a roll needs to be repaired, the entire manufacturing line must be stopped while the roll is removed from operational service. If a spare roll is available, it can be installed. Otherwise the line remains down while the damaged roll is repaired, rebalanced and reinstalled. While it may be possible to actually repair a roll on the spot, balancing machines to rebalance the roll are typically only available at the roll manufacturing facilities. Depending on the severity of the roll failure, the rolls may have to be removed from the manufacturing site, transported back to the manufacturing facility for repair, rebalancing or both before being returned to the manufacturing site for reinstallation. While such instances of roll repair are not frequent, they can be extremely and even catastrophically destructive to the operation and business of the roll user.

It would therefore be very useful to provide rolls which are capable of being repaired on site and immediately returned to operational service with a minimum dow time of the line in which the roll is installed.

There are no absolute requirements for the amount of residual imbalance which is permissible in such carrier rolls. Individual users may specify permissible residual imbalances for their rolls based upon special requirements. Where permissible residual unbalances are not specified, it is widely the practice in the industry to balance the rolls to within a Balance Quality Grade G-6.3 residual unbalance value as defined in Acoustical Society of America Standard 2-1975 for "Balance Quality of Rotating Rigid Bodies". This standard has also been approved by the American National Standards Institute as standard ANSI S2.19-1975.

SUMMARY OF THE INVENTION

In one aspect, the present invention is a method of fabricating a roll comprising a body assembly and a pair of journals, the roll having a mass of at least about 100 pounds and being balanced to within a predetermined first residual unbalance value for rotation up to a predetermined maximum service speed of at least about 100 RPM, comprising the steps of: fabricating a pair of substantially identical metal journals, each journal being adapted for removable mounting to an axial end of the body assembly and being balanced to within a second residual unbalance value less than the first residual unbalance value; fabricating a body assembly including a hollow, generally cylindrical metal body with a pair of opposing axial ends, and a pair of metal end heads, each end head being fixedly mounted with the body in a separate one of the axial ends of the body and being adapted for removably mounting one of the journals, the body assembly being balanced to within a third residual unbalance value less than the difference between the first residual unbalance value and twice the second residual unbalance value; and removably mounting the pair of journals to the end heads to form the roll balanced to within the first residual unbalance value.

In another aspect, the invention is a roll fabricated by the foregoing method.

Other aspects of the invention include the prebalanced body assembly and the prebalanced journals used in the fabricating steps as well as a method of repairing such rolls.

BRIEF DESCRIPTION OF THE DRAWINGS

The foregoing Summary of the Invention, as well as the following Detailed Description of the Preferred In the drawings.

DESCRIPTION OF THE PREFERRED EMBODIMENT

Figure 1:
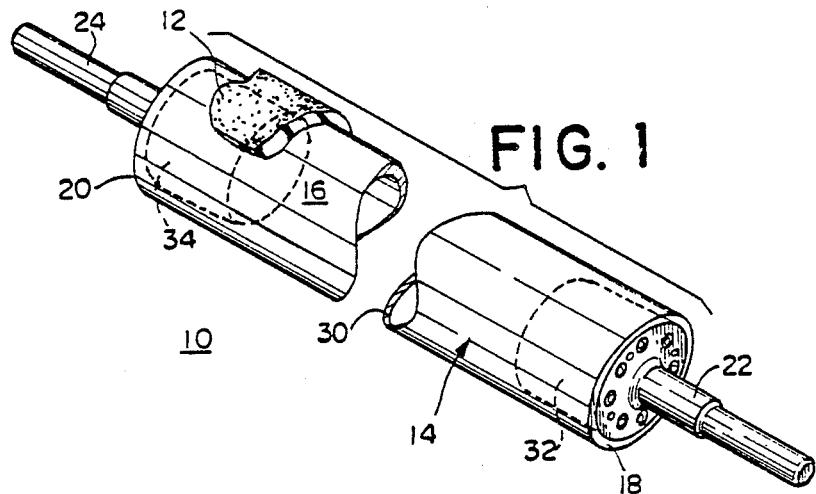
FIG. 1 is a perspective view of a carrier roll fabricated according to the present method.

Referring to the drawings, wherein like numerals are employed for the indication of like elements throughout, there is shown an exemplary preferred embodiment carrier roll, according to the present invention, and generally designated as 10. The roll 10 may optionally be provided with a cover 12 of rubber, glass fiber reinforced epoxy or other material conventionally employed in the construction of such rolls for use in paper manufacturing, non-woven fabric manufacturing and other known applications. The roll 10 includes a generally cylindrical body assembly 14 having a circumferential outer surface 16 to which the cover 12 is attached, if provided, and a pair of substantially identical metal journals 22 and 24 each journal being mounted at a separate axial end 18 and 20 of the body assembly.

Figure 3:
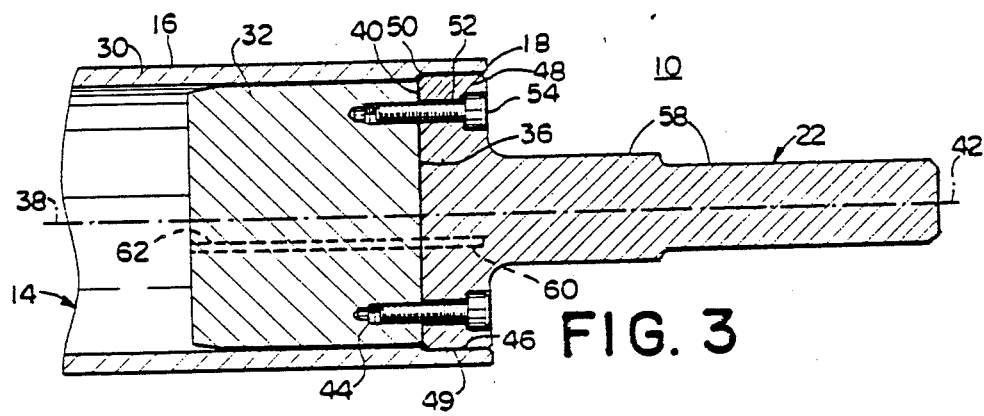
FIG. 3 is a localized longitudinal section view of the axial end of the carrier roll depicted in FIG. 2 along the lines 3—3.

Referring now to FIG. 3, the axial end 18 of the body assembly 14 is sectioned, revealing a hollow, generally cylindrical metal body 30, one of a pair of the opposing axial ends of the body, and one of a pair of substantially identical metal end heads, the one end head 32 being depicted in FIG. 3 and each of the pair of end heads 32 and 34 being depicted in phantom in FIG. 1.

Each end head 32 and 34 is fixedly mounted with the body 30 by means of an interference fit achieved by oversizing the maximum outer diameter of each end head 32, 34 with respect to the opposing inner diameter of the body 30 at the open axial ends receiving the end heads 32 and 34.

Referring to FIG. 3, the removable mounting of the journal 22 to the end head is indicated. The mounting of journal 24 with end head 34 at the remaining axial end of the body assembly 14 is identical. The end head 32 is recessed into the body 30 from the extreme axial end 18 and forms, with a cut portion of the inner surface of the body 30, a circular recessed pilot 46. The recessed pilot 46 receives a circular end flange 48 of the journal 22.

The end head 32 is specifically adapted for removably mounting the journal 22 by the provision of a face 36 square (i.e. at right angles) to a central axis 38 of the circumferential outer surface 16 of roll assembly 14 for contactingly receiving a planar end face 40 on the end flange 48 of the journal 22. The end face 40 of the journal is also squared to a central axis 42 of the journal 22. The end head 32 is further provided with a plurality of threaded bores 44, two of which are indicated in FIG. 3. A total of eight such threaded bores 44 are provided (see FIG. 2) although fewer or greater bores may be provided depending upon the size and use of the roll. The bores 44 are uniformly angularly spaced around a circle concentric with the central axis 38. The recessed pilot 46 and circular end flange 48 strengthen the coupling between the journal 22 and the body assembly 14 and assure concentricity between the journal 22 and body assembly 14. The outer diameter of the circular end flange 48 is slightly greater than the inner diameter of the circular recessed pilot 46 for an interference centering fit of the journal 22 in the axial end 18 of the body assembly 14. A conical chamfer 50 between the planar face 40 and the circumferential outer surface 49 of the cylindrical end flange 48 assists in initially centering the end flange 48 with respect to the circular recessed pilot 46 prior to insertion of the end flange 48 into the pilot 46. The end flange 48 includes a number of bolt holes 52, countersunk smooth bores, equal to the number of threaded bores 44 in the end head 22 and positioned in the journal 22 to align with the threaded bores 44 when the journal 22 is seated in the recessed pilot 46 to permit the passage of a head bolt 54 through each of the bolt holes 52 and into the aligned threaded bore 44 in the end head 22. The circular end flange 48 is pulled into the circular recessed pilot 22 by tightening the bolts 54 into the threaded bores 44. Walls of the circular end flange 48 and/or circular recessed pilot 46 may be coated with an anti-seizing material, such as "NEVER SEEZE TM", to aid in passing the end flange 48 into the recessed pilot 46 and in the subsequent removal of the flange 48 should it be desired to remove the journal at a future time. A plurality of threaded bores are provided as back-out holes 56 (see FIG. 2) through the end flange 48 (suggestedly along the circle concentrically surrounding the central axis 42 of the journal 22 and defined by the location of the bolt holes 52). The back-out holes 56 are also suggestedly uniformly spaced from one another and from adjoining pairs of bolt holes 52 concentrically around the central axis 42. Four back-out holes 56, each 90 degrees apart, may be provided, although, in other applications, two back-out holes, spaced 180 degrees apart, or eight back-out holes, spaced 45 degrees apart, may be desired for other rolls. The back-out holes 56 receive jack screws such as bolts (omitted from the figures for clarity) to force the circular end flange 48 from the recessed pilot 46. In addition to the circumferential outer surface 49 of end flange 48, the remainder of the circumferential outer surface 58 of the journal 22 is a symmetric outer surface of rotation concentrically surrounding the central axis 42 of the journal 22.

Figure 2:
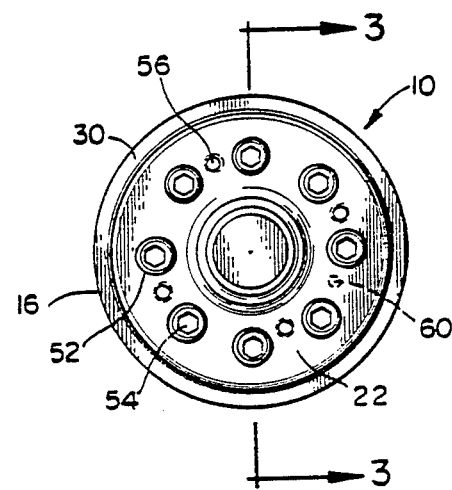
FIG. 2 is an axial end elevation view of the carrier roll of FIG. 1.

To assist in assembling rolls with covers, small vent holes 60 and 62 (indicated in phantom in FIG. 3) are provided in an axial direction through the journal 22 and the end head 32, respectively. Vent hole 60 receives a tapered body tap to receive a steam line for heating the body interior to assist in applying the cover. As indicated in FIG. 2, the vent holes 60 and 62 are suggestedly provided along the concentric circle of bolt holes 52 in the journal end flange 48 and the matching circle of threaded bores 44 in the end head 32, again suggestably between adjoining pairs of those holes and bores, to insure alignment of the vent holes 60, 62 during assembly. The vent hole 60 is plugged after use by means of a conventional threaded plug joint to seal the roll interior.

Carrier rolls of the foregoing construction for use in paper making typically have a minimum outer diameter of about six inches, a minimum length of about sixty inches, a minimum mass of about 200 pounds and a maximum service speed of at least about 100 RPM to provide a circumferential surface speed of at least about 160 feet per minute. However, it is envisioned that the present fabricating method might be used to construct still smaller rolls operated at speeds other than those typically encountered in a paper making line. Accordingly, it is not intended to limit this invention strictly to rolls employed in paper making lines, and it is intended that the invention be employed in the fabrication of any rolls, the construction of which may be adapted to the described method.

A presently preferred method of fabricating uncovered carrier rolls 10 will now be described. The body assembly 14 and journals 22 and 24 are separately fabricated and are not joined until final assembly.

Each of the journals is fabricated in the same way. The preferred method is to cut a piece of 1045 HRS (hot roll steel) bar stock to a suitable length slightly longer than the desired final length to permit finishing of the journal. The cut stock is set up in a numerical control lathe like the CNC Lathe by Dainichi of Japan, to face what will be the end face 40 of the journal, to turn a standard 82 degree conical seat at the center of the flange end face 40 on what will be the axial center line 42 of the journal, and to turn back about two inches of the outer circumference of the stock adjoining the face 40 to form the circular end flange outer surface 49. It has also been found beneficial to counterbore the center of the end face 40 approximately 1/16 inch deep to a diameter about 1½ inches less than the diameter of the circle of bolt holes 52 to relieve the metal and to prevent the need for a second facing operation after machining of the remainder of the journal. The ends of the journal stock are rotated in the computer numerical control lathe and the remaining circumferential outer surface 58 turned. The flange end of the turned stock is thereafter mounted in a suitable numerical control drill press like an NC Drill Press by Brown and Sharp of the U.S., for concentrically drilling the bolt holes 52 and drilling and tapping the back-out holes 54. The journals are cleaned and deburred.

Referring next to the fabrication of the body assembly 14, the body 30 is a metal body of any suitable construction. Seamless steel tube construction is strongly preferred to seamed construction, because of better initial balance and concentricity. Drawn over mandrel ("DOM") steel tubing, when available in the outer diameters and lengths desired, has been preferred. Such tubing is widely available from a number of steel suppliers in varying diameters. For sizes larger than available DOM tubing sizes, A106 Grade B and centrifugally cast steel pipe are suggested. DOM tubing may be so concentric and uniform that prebalancing is not required. If either of the A106 Grade B or centrifugally cast steel pipes are used it may be necessary to prebalance the body in a conventional way prior to assembly. The body should be prebalanced to within a residual unbalance value sufficiently low that the body assembly can also be balanced to within its allowed residual unbalance value by drilling the end heads. The body is checked for overall length and should be slightly oversized to permit facing at the axial ends. Inner diameters at the axial ends of the body are measured for sizing the end heads received in those ends. The body is checked overall for straightness and concentricity. It is suggested at least for the type of rolls typically employed in paper making manufacturing lines, that the outer surface of the body have a total indicated runout ("TIR") within about 0.010 inch and preferably within about 0.005 inch along its entire length.

Each end head 32 and 34 is made in the following manner. A length sufficient to allow for the described finishing length is cut from a metal bar stock such as a class 30 gray cast iron. The finished length should be approximately equal to the inner diameter of the body. The cut length is mounted by one axial end on a lathe, preferably a computer numerical control lathe like the Dainichi CNC Lathe, for shaping. The other axial end of the cut stock, which will face outwardly from the body assembly, is faced and counterbored to provide a conical seat at the center of the face as a reference for future machining operations. The cut length is reversed on the lathe and an outer diameter cut. The outer diameter is beveled with the bevel tapering down from the outer diameter to the one axial end of the stock. The one axial end is then faced for balance. The beveled end of the end head will be inserted first into the hollow interior of the body. Suggestedly, the maximum outer diameter of the end head is sized about 0.001 inch per inch of diameter of the body greater than the nominal inner diameter of the body at the axial end receiving the end head. This sizing and the bevel at the one end of the end head permits the end head to be pressed into the axial end of the body by means of a hydraulic press. Before the end heads are pressed into the body, the plurality of bores 44 are drilled and tapped, preferably with a numerical control drill press like the NC Drill Press by Brown and Sharp.

After the end heads 32 and 34 have been pressed into the body, the unfinished body assembly is mounted in an engine lathe centered on the conical seats in the end heads. In the lathe, the outer diameter of the body can be checked for TIR and straightened to obtain an allowable TIR. It is possible to straighten the body assembly in a conventional fashion by heating the body opposite the high spot(s). For the six to fourteen inch outer diameter rolls typically employed in paper making manufacturing lines, a TIR for the body assembly of about 0.010 inch is usually acceptable and about 0.005 inch or less is preferred. After straightening, balance spots are provided proximal each axial end of the body assembly by machining a light skim cut about four inches wide around the circumference of the body at either axial end. The cuts take the TIR of the body assembly at the cuts down to about 0.001 inch at each cut. Either before or after that operation, either axial end of the body assembly is faced and counterbored for the circular recessed pilot. The end head and counterbored inner circumferential surface of the body within the counterbore are faced providing the planar face 36. The body assembly 14 is thereafter mounted on the balance spots in an externally supporting dynamic balancing machine such as a Hard Bearing Balancing Machine by Schenck Treble and dynamically measured for balance, in a conventional fashion. The body assembly is balanced to within a third residual unbalance value less than the difference between the predetermined first residual unbalance value desired for the entire roll and twice the second residual unbalance value permitted each of the journals. If balancing of the body assembly is required to bring it within the third residual unbalance value, it is done in a conventional fashion by drilling the end head(s).

The roll is assembled in the following manner. The circumferential outer surface of the journal end flange 48 and recessed pilot 46 are coated with a suitable antiseize material, the journal bolt holes aligned with the end head threaded bores and head bolts 54 installed through the bolt holes 52 into the threaded bores 44 and torqued to specification. Set screws are installed in the back-out holes 56 for future use and to prevent corrosion through those holes.

Carrier rolls fabricated according to the foregoing method are sufficiently balanced for operational service immediately after assembly. Further balancing is not required. An important aspect of the invention is that the body assembly and each of the journals is separately balanced to within a residual unbalance value which is less than the residual unbalance value permitted for the entire roll. Stated another way, if the roll 10 of the present invention is to be balanced within a predetermined first residual unbalance value for rotation up to a predetermined maximum service speed, the journals are balanced to within a second residual unbalance value less than the first residual unbalance value and the roll assembly is further balanced to within a third residual unbalance value less than the difference between the first residual unbalance value and twice the second residual unbalance value allowed each journal.

It is important that only unbalance "values" i.e. magnitudes are being considered. Unbalance states are typically represented by vectors including a residual unbalance value (i.e. magnitude) and a direction. In conventional roll construction, the combined individual unbalance values (i.e. magnitudes) of roll assemblies and journals invariably exceed the residual unbalance value of the entire roll but have a net vectorial residual unbalance magnitude which is less than the sum of the individual residual unbalance values and equal to the resulting residual unbalance value of the roll. If disassembled, such rolls must be identically reassembled, with the same journals located at the same axial ends and in the same angular orientation with respect to the same body assembly to maintain the roll in balance.

In order to assure providing a carrier roll meeting suggested industry standards, i.e. balanced to within a Balance Quality Grade G-6.3 residual unbalance value, as specified in Acoustical Society of America Standard 2-1975 for rotation of the roll up to a predetermined maximum service speed, it is preferred that each one of the body assembly and two journals be balanced to within a Balance Quality Grade G-2.5 residual unbalance value as specified in that Acoustical Society of America Standard 2-1975 for rotation of the body assembly and each journal at the predetermined maximum service speed. The ASA Standard 2-1975, as approved by ANSI and also known as ANSI S2.19-1975, is incorporated by reference as if set forth in its entirety herein.

The word "within" when used herein in such phrases as "within . . . a residual balance value" and "to a TIR within . . . " is used in the conventional sense of being within a specification, that is, as being "equal to or less than" or "not greater than".

In large part, the success of the foregoing method for manufacturing carrier rolls is based on the ability to accurately machine journals and journal mounting positions at the axial ends of the roll body assembly. It has been found possible to machine journals true to about 0.001 inch TIR (all surfaces) using the previously described numerical control machines. It has further been found possible to machine recessed pilots concentric and coaxial to within about 0.002 inch TIR with respect to the body assembly center at the end of the body assembly. This type of concentricity may be verified by measuring the TIR of the inner diameter of the recessed pilot with respect to the precision skim cut around the outer surface of the body at the end of the body adjoining the recessed pilot for balancing the body assembly or the conical seat provided in the end head for centering that cut.

Preferably, the journals are machined to as small a TIR as is reasonably possible to maximize the permissible residual unbalance of the roll assembly. It is believed at least with respect to conventionally sized carrier rolls for paper making lines, that machining of the journals to within about a 0.002 inch TIR, or at least machining the end flange circumferential outer surface to such a TIR with respect to the bearing surface of the journal, would be sufficient to balance the resulting journal to within a Balance Quality Grade G-2.5 residual unbalance value as defined in the previously identified and incorporated Standard. Of course, it is preferred that as much of the journal body as possible be machined to the lowest TIR possible to maximize the balance and concentricity of the journal.

Suggestedly, if the fully assembled roll is held to a predetermined, acceptable TIR, such as, for example, 0.010 inch, then the body assembly is also held to within a TIR which is no greater than the difference between the predetermined acceptable TIR for the roll and the greatest TIR allowed the journals.

As an example of the invention, a roll having a 9½ inch nominal outer diameter, 114 inch face length (axial length of the body) and mass of 875 pounds was fabricated from a DOM tube of the same nominal outer diameter with a ½ inch wall, the surface of which was chrome plated to a thickness of two to three mils after fabrication. The journals were approximately thirty-five pounds each, nominally 8½ inches in outer diameter at the flange and 2⅞ inches in diameter at the bearing surface and machined to a TIR of about 0.001 inch on all surfaces of rotation. Overall TIR for the roll was within about 0.005 inch. The roll was further adapted to be driven by the provision of a key recess four inches long by ¼ inch square at the extreme outward axial end of the journal on an outer surface of the journal. Even with the key recess, the journal was found to be within a Balance Quality Grade G-2.5 for rotation up to a maximum service speed of about 200 RPM providing a maximum roll surface speed of about 500 feet per minute.

The method for constructing covered rolls is essentially the same as that previously given for fabricating uncovered rolls. As was previously indicated, vent holes are provided through a journal and an adjoining end head and aligned to permit steam or other heated fluid to be passed into the hollow body interior for heating to assist in applying the cover. Those holes would be machined during fabrication of the end head and journal before assembly. After covering the roll, the vent hole 60 is closed with a conventional threaded plug to seal the body assembly interior. Before covering, the body assembly is suggestedly trued to a 0.060 inch TIR outer diameter and balanced to within an acceptable residual unbalance value. The cover is applied and the outer diameter trued to within a TIR of about 0.010 inch (or whatever other TIR may be specified) and the unbalance of the covered roll measured. If balancing is required, it is suggestedly accomplished by removing the appropriate journal(s) and removing an appropriate amount of metal from the end head(s), in the conventional manner to bring the roll body to within a residual unbalance value less than the difference between the allowed residual unbalance value for the roll and the residual unbalance value permitted the journals.

Repair of the rolls of the present invention by exchanging journals is also relatively straightforward. A journal of the carrier roll of the present construction is replaced by separating the journal from the bearing supporting it and removing the journal from the body assembly. The journal is readily removable by removing the head bolts 54 and tightening the bolts provided in the back-out holes 56. Repair continues with the steps of replacing the journal on the body assembly with a prebalanced journal substantially identical to the removed journal, reinstalling the replacement journal in the bearing and replacing the carrier roll in operational service. This is accomplished without the need to rebalance the roll after the replacement journal is installed.

Although a specific embodiment invention has been shown and described, other embodiments, modifications may occur to those of ordinary skill in the art, and the appended claims are intended to cover any such modifications which fall in the true spirit and scope of the claims.

What is claimed is:

1. A method of constructing a carrier roll comprising a body assembly and a pair of journals, the roll having a mass of at least about 100 pounds and being balanced to within a predetermined first residual unbalance value for rotation up to a predetermined maximum service speed of at least about 100 RPM, comprising the steps of:
    fabricating a pair of substantially identical metal journals, each journal being adapted for removable mounting to either end of the body assembly and being balanced to within a second residual unbalance value less than the first residual unbalance value;
    fabricating a body assembly including a hollow, generally cylindrical metal body with a pair of opposing axial ends, and a pair of metal end heads, each end head being fixedly mounted with the body in a separate one of the axial ends of the body and being adapted for removably mounting one of the journals, the body assembly being balanced to within a third residual unbalance value less than the difference between the first residual unbalance value and twice the second residual unbalance value; and
    removably mounting the pair of journals to the end heads to form the roll balanced to within the first residual unbalance value.

2. The method of claim 1 wherein the balance of each of the pair of metal journals and of the body assembly remains unchanged after the step of removably mounting the pair of journals to the roll body.

3. The method of claim 1 wherein each journal is balanced to within a Balance Quality Grade G-2.5 residual unbalance value as specified in Acoustical Society of America Standard 2-1975 for rotation of the journal mass up to the predetermined maximum service speed.

4. The method of claim 1 wherein the body assembly is balanced to within a Balance Quality Grade G-2.5 residual unbalance value as specified in Acoustical Society of America Standard 2-1975 for rotation of the body assembly mass up to the predetermined maximum service speed.

5. The method of claim 1 wherein the predetermined first residual unbalance value is within a Balance Quality Grade G-6.3 residual unbalance value as specified in Acoustical Society of America Standard 2-1975 for rotation of the roll mass up to the predetermined maximum service speed.

6. The method of claim 1 wherein the journal fabricating step comprises fabricating each journal to a total indicated runout within about 0.002 inch.

7. The method of claim 1 wherein each journal has a central axis and a symmetric outer surface of rotation surrounding the central axis and wherein the journal fabricating step comprises cutting the symmetric outer surface of the journal with an automatically positioned tool.

8. The method of claim 1 wherein the body assembly fabricating step comprises providing a circular recessed pilot at each axial end of the body assembly for receiving an axial end of a journal; and
    wherein the journal fabricating step comprises providing a circular flange on an axial end of each journal, the circular flange having an outer diameter slightly greater than the inner diameter of each recessed pilot for interference fit between the end flange and either pilot.

9. The method of claim 8 wherein the body assembly fabricating step comprises forming an inner circumferential surface of each recessed pilot to a total indicated runout within about 0.002 inch.

10. The method of claim 1 wherein the body assembly fabricating step comprises the steps of:
    assembling the body assembly;
    forming journal mounting positions at axial ends of the body assembly; and
    rotationally balancing the body assembly without mounted journals.

11. The carrier roll fabricated by the method of claim 1 having a mass of at least about 100 pounds and balanced for rotation up to a predetermined maximum service speed of at least about 100 RPM.

12. A method of repairing a carrier roll having a mass of at least about 100 pounds and balanced to within a predetermined first rotational unbalance value for rotation up to a predetermined maximum service speed of at least 100 RPM, the roll comprising a body assembly including a generally cylindrical hollow metal body and a metal end head in each axial end of the body and a pair of substantially identical metal journals, each journal being removably mounted to a separate one of the end heads at the axial ends of the body and supported for operational service in a bearing, comprising the steps of:
    separating one journal from a bearing supporting the one journal;
    removing the one journal from the body assembly;
    replacing the one journal on the body assembly with a prebalanced journal substantially identical to the one journal, the replacement journal being prebalanced to within a Balance Quality Grade G-2.5 residual unbalance value as specified in Acoustical Society of American Standard 2-1975 for rotation of the journal mass up to the predetermined maximum service speed;
    reinstalling the replacement journal in the bearing; and
    replacing the roll in operational service without rebalancing the roll after the journal replacing step.

13. The method of claim 12 wherein the roll has a residual unbalance value within a Balance Quality Grade G-6.3 residual unbalance value as specified in Acoustical Society of America Standard 2-1975 for rotation of the roll mass up to the predetermined maximum service speed, upon replacement of the one journal with the replacement journal without any additional balancing of the roll.

14. The method of claim 12 wherein the replacement journal has a total indicated runout within about 0.002 inch.

15. The method of claim 12 wherein the replacement journal has a total indicated runout within about 0.001 inch.

16. A carrier roll having a mass of at least about 100 pounds and balanced to within a predetermined first residual unbalance value for rotation up to a predetermined maximum speed of at least about 100 RPM, comprising:
- a pair of substantially identical metal journals, each journal being adapted for removable mounting to an end of the body assembly and being balanced to within a second residual unbalance value less than the first residual unbalance value;
- a body assembly including a hollow, generally cylindrical metal body with a pair of opposing axial ends, and a pair of metal end heads, each end head being fixedly mounted with the body in a separate one of the axial ends of the body and being adapted for removably mounting one of the journals, the body assembly being balanced to within a third residual unbalance value less than the difference between the first residual unbalance value and twice the second residual unbalance value; and
- mounting means for removably mounting the pair of journals to the end heads whereby the roll is balanced to within the first residual unbalance value.

17. The roll of claim 16 wherein the predetermined first residual unbalance value is within a Balance Quality Grade G-6.3 residual unbalance value as specified in Acoustical Society of America Standard 2-1975 for rotation of the roll mass up to the predetermined maximum service speed.

18. The roll of claim 16 wherein the body assembly is balanced to within a Balance Quality Grade G-2.5 residual unbalance value as specified in Acoustical Society of America Standard 2-1975 for rotation of the body assembly up to the predetermined maximum service speed.

19. The roll of claim 16 wherein each journal is balanced to within Balance Quality Grade G-2.5 is balanced to within a Balance Quality Grade G-2.5 residual unbalance value as specified in Acoustical Society of American Standard 2-1975 for rotation of the journal mass up to the predetermined maximum service speed.

20. The roll of claim 19 wherein each journal has a total indicated runout of within about 0.001 inch.

21. The roll of claim 16 further comprising:
- a circular recessed pilot at each axial end of the body assembly for receiving an axial end of one of the journals; and
- a circular flange on an axial end of each journal, the circular flange having a outer diameter slightly greater than the inner diameter of each recessed pilot for interference fit between the end flange and either pilot.

22. The roll of claim 21 wherein an inner circumferential surface of each recessed pilot has a total indicated runout within about 0.002 inch.

* * * * *